May 14, 1957 M. H. STARR 2,792,210
VEHICLE LOAD ELEVATING AND INDICATING MECHANISMS
Filed July 23, 1953 3 Sheets-Sheet 1
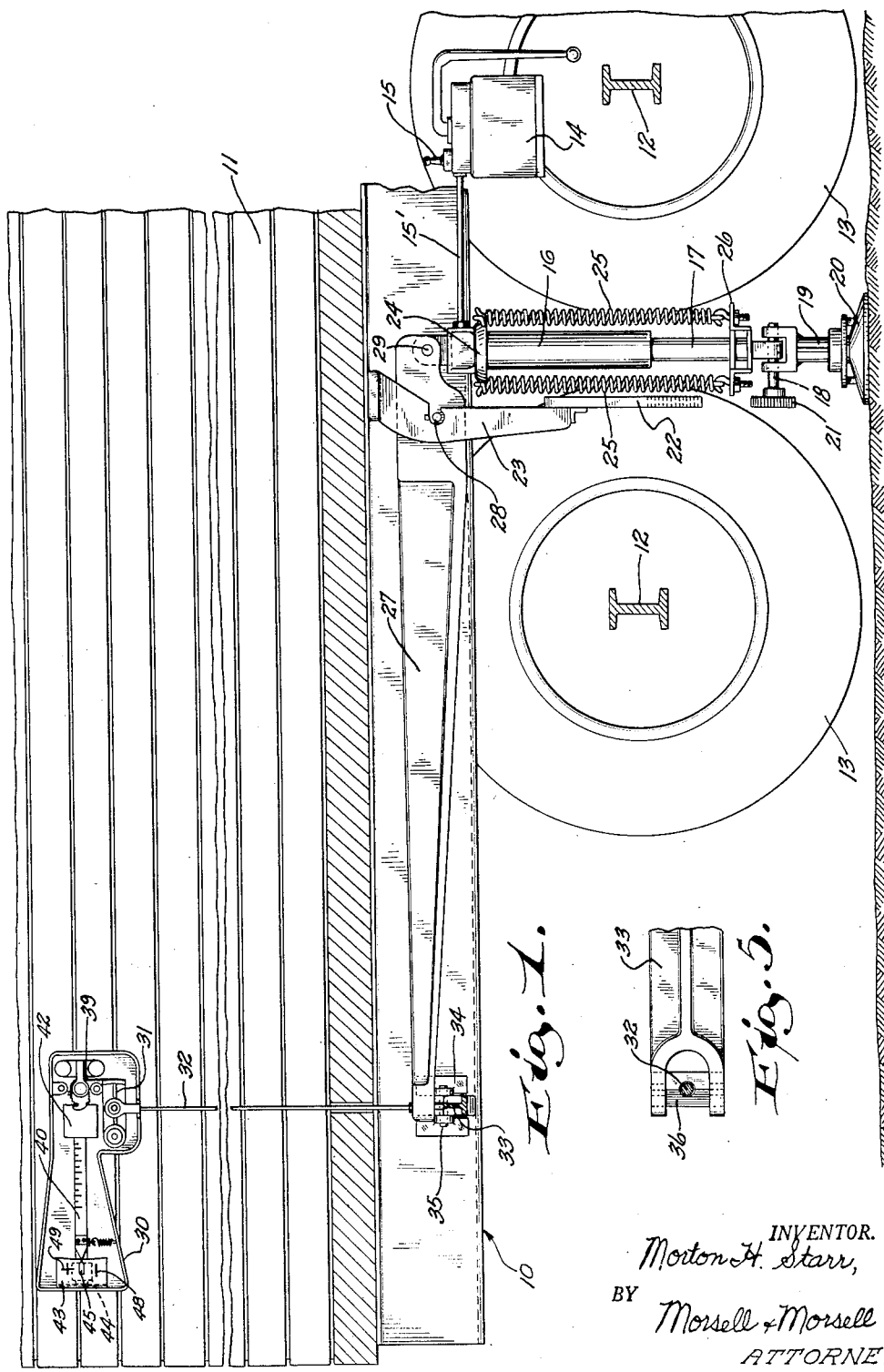
INVENTOR.
Morton H. Starr,
BY Morsell & Morsell
ATTORNEYS.

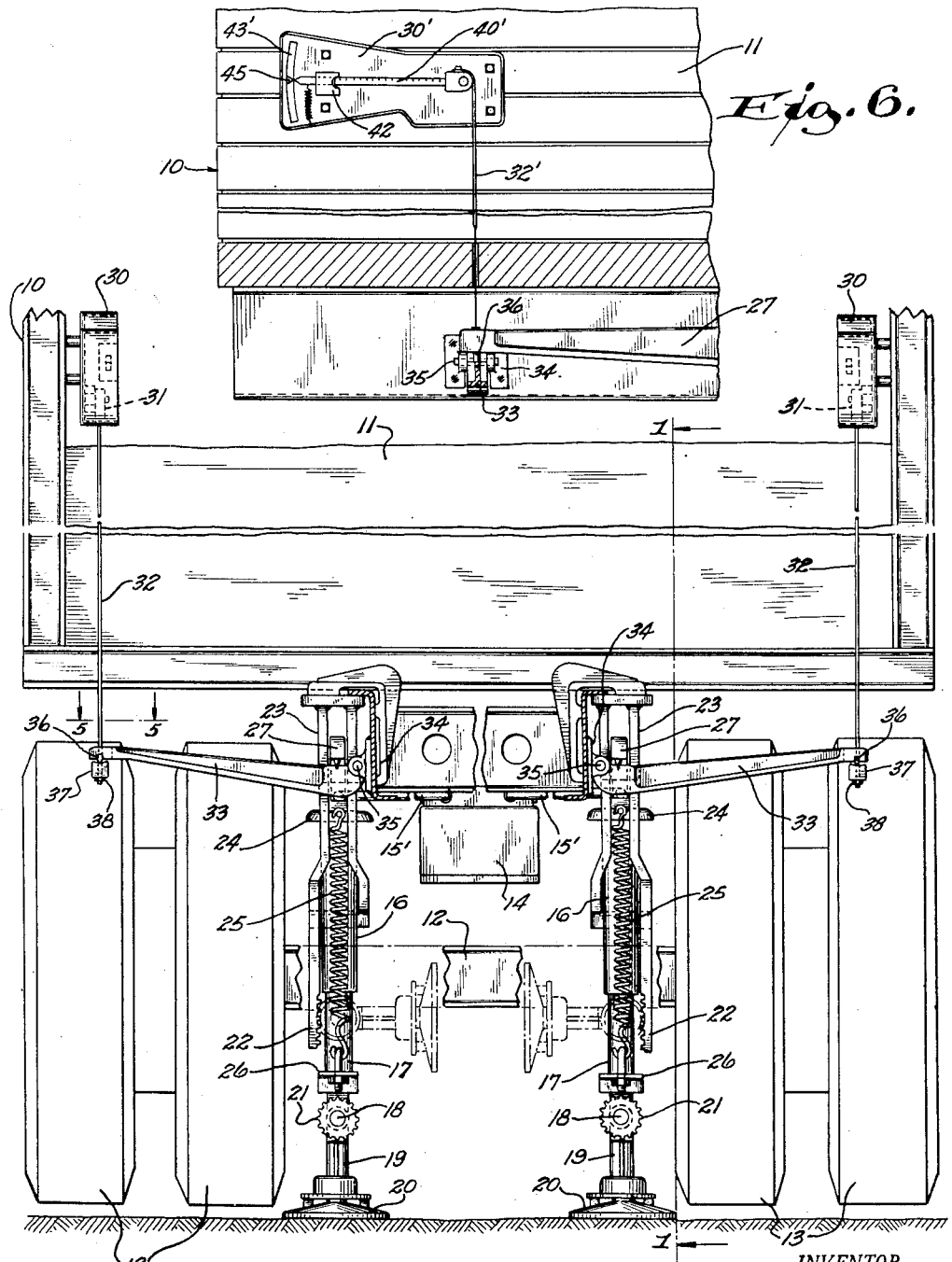

May 14, 1957 M. H. STARR 2,792,210
VEHICLE LOAD ELEVATING AND INDICATING MECHANISMS
Filed July 23, 1953 3 Sheets-Sheet 3
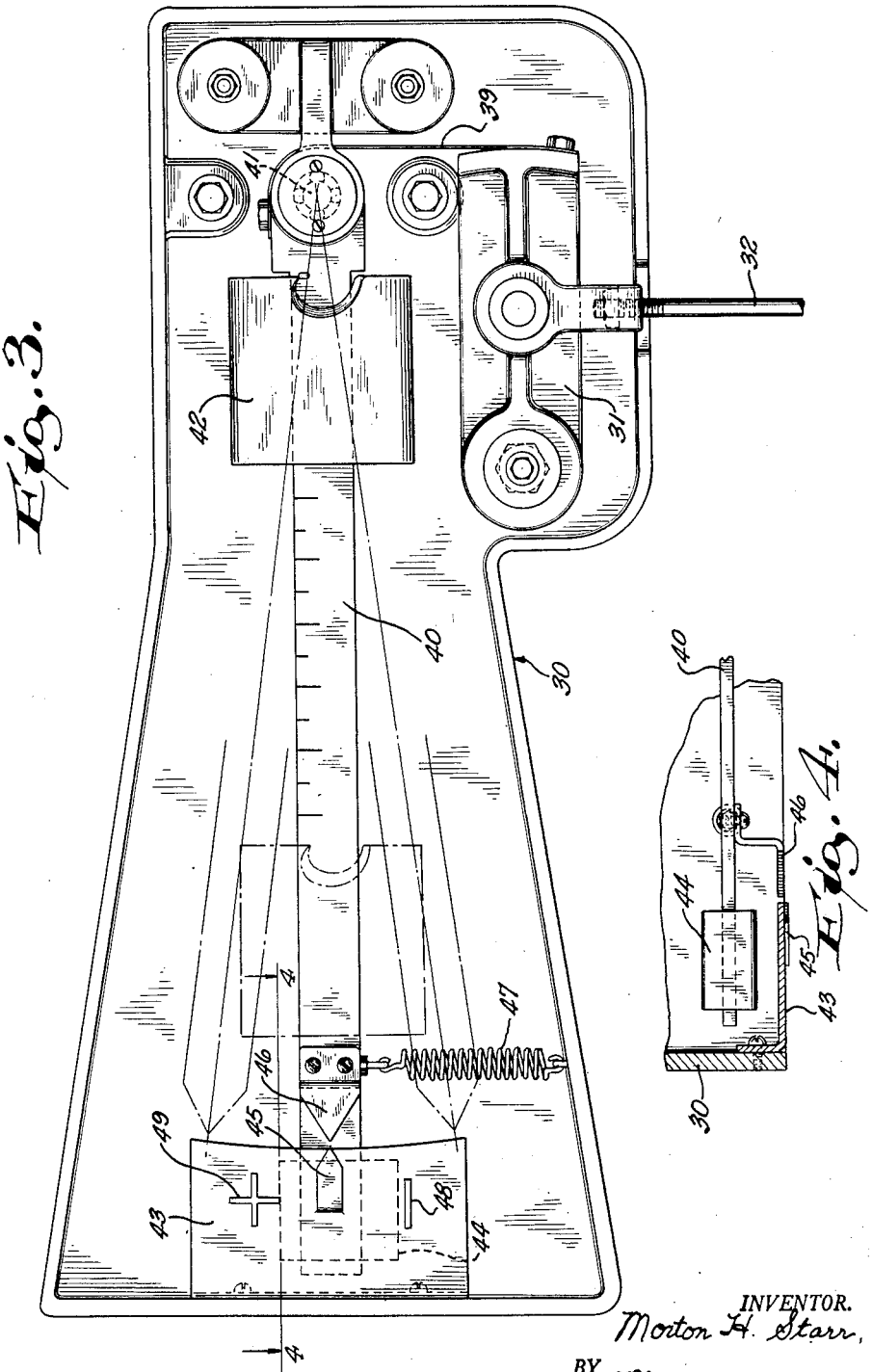
INVENTOR.
Morton H. Starr,
BY Morsell & Morsell
ATTORNEYS.

United States Patent Office 2,792,210
Patented May 14, 1957

2,792,210

VEHICLE LOAD ELEVATING AND INDICATING MECHANISMS

Morton H. Starr, Milton Junction, Wis.

Application July 23, 1953, Serial No. 369,808

6 Claims. (Cl. 265—40)

This invention relates to improvements in vehicle load elevating and indicating mechanisms, and more particularly to a mechanism of the type mentioned which is permanently borne by the vehicle.

In respect to cargo and freight carrying vehicles such as trucks, trailers, semi-trailers and vans, the various States have laws, subject to severe penalties for violations, limiting the gross, axle, and in many cases the wheel loads for such freight or cargo vehicles traveling over the public highways. The operators of carriers of this class find that the problem of maintaining the proper and legal weight distribution in respect to their loaded vehicles is a very serious problem. A vehicle may leave its terminal with a regular load, but during the trip if there are pick-ups and deliveries the original load may be varied to a point where the load limits permitted by the State law are exceeded. It is not always possible for the vehicle operator, during his trip, to find a scale and in any event the procedure of weighing the vehicle load is both inconvenient and time consuming.

With the above problems in mind it is a primary object of the present invention to provide a vehicle carried load indicating mechanism whereby the vehicle operator may at any time accurately determine whether or not the vehicle load is below or in excess of a predetermined amount, ordinarily that allowed by the particular State law.

A further object of the invention is to provide a vehicle carried load indicating mechanism which through a simple operation will indicate to the vehicle driver whether or not his load is in excess of a predetermined limit, which indication may be quickly obtained at any point in the route of the vehicle.

A further object of the invention is to provide a vehicle load elevating and indicating mechanism which is at all times available and in which the vehicle elevating mechanism is fulcrumed on the load weighing or indicating mechanism to permit quick operation and observation of the load indicating mechanism, the load elevating mechanism also permitting servicing of portions of the vehicle, if necessary, as well as inspection, removal and replacement of tires and brakes.

A further object of the invention is to provide vehicle load elevating and indicating mechanism wherein the elevating mechanism is power operated and controlled, and when functioning, immediately puts into operation, automatically, the load indicating mechanism.

A further object of the invention is to provide a vehicle load elevating and indicating mechanism which can be readily applied to any form of load carrying vehicle in a simple and relatively inexpensive manner, which does not interfere with the normal operation and use of the vehicle, which is strong and durable and efficient in its operation, and which is well adapted for the purposes described.

With the above and other objects in view the invention consists of the improved vehicle load elevating and indicating mechanism, and its parts and combinations as set forth in the claims, and all equivalents thereof.

In the accompanying drawings in which the same reference characters indicate the same parts in all of the views:

Fig. 1 is a fragmentary longitudinal vertical sectional view of a truck or the like equipped with the improved load elevating and indicating mechanisms, said view being taken approximately along the line 1—1 of Fig. 2;

Fig. 2 is an end view of the showing in Fig. 1 with parts being shown in section;

Fig. 3 is an enlarged face view of the indicator housing and indicating mechanism therein;

Fig. 4 is a fragmentary detail sectional view taken on line 4—4 of Fig. 3;

Fig. 5 is an enlarged fragmentary detail sectional view taken on line 5—5 of Fig. 2 showing the bifurcated outer end of one of the transverse indicator operating levers; and Fig. 6 is a fragmentary side view, with parts in section of the inner face of the truck body wall with a modified or simplified type of indicator mounted thereon.

Referring now more particularly to the drawings, a freight or cargo carrying motor vehicle of the truck or van type is indicated generally by the numeral 10. As is shown in Figs. 1 and 2 a portion of the load of the vehicle body 11 is borne by spaced apart transverse axles 12 which carry sets of tandem wheels 13, one set of load elevating mechanism being preferably applied to the sub-frame of the vehicle in the neighborhood of the tandem wheels 13, so that when the load elevating mechanism is in operative position the wheels 13 may be elevated above the ground or roadway through the support of the load by said interposed elevating mechanism. Similar mechanism, and associated load indicators, may be applied to other portions of the vehicle which bears a portion of the load.

Specifically, the load elevating mechanism includes a hydraulic pump 14 rigidly mounted below a sub-frame portion of the vehicle between the sets of tandem wheels 13. Associated with the hydraulic pump 14 in the conventional manner is a valve 15 (Fig. 1) which controls the flow of hydraulic fluid through oppositely directed hose connections 15' which extend to and open into the upper ends of a pair of spaced apart hydraulic ram cylinders 16, it being understood that the hydraulic fluid under pressure acts on the upper ends of pistons 17 within the hydraulic ram cylinders and will project said pistons and the parts carried thereby downwardly. The lower end of each ram cylinder piston 17 has journalled therethrough a transverse pivot shaft 18 on which is secured the bifurcated upper end of a leg 19 having a relatively broad ground engaging foot 20 on its lower end. Each pivot shaft 18, on an end thereof carries fast a rack pinion 21 arranged, during a certain portion of the vertical travel of the piston 17 to mesh with the teeth of a vertical rack 22. The racks 22 for their respective ram cylinders are rigidly depended from fulcrum posts 23 secured to and depending from the vehicle frame. The upper end portion of each ram cylinder 16 rigidly carries a collar 24 and each collar forms the anchorage for the upper ends of a pair of coiled springs 25 whose lower ends are attached to an anchorage plate 26 rigidly carried by the lower end of a piston 17.

From the foregoing description of the vehicle elevating hydraulic rams it should be understood that when said elevating rams are in inoperative positions and the vehicle wheels are engaging the ground, the pivotally mounted legs 19 and feet 20 will be carried in the broken line position shown in Fig. 2 at right angles to the axes of the ram pistons 17 and substantially elevated above the ground. When the control valve 15 of the hydraulic pump 14 is opened hydraulic fluid under pressure will flow through the hoses 15' into the upper ends of the ram cylinders 16 to start the downward projection of the ram pistons 17. During this initial downward movement of the ram pistons 17 with the rack pinions 21 being in engagement with the racks 22, the pivotally mounted legs 19 will be caused to swing from the raised horizontal positions shown in broken lines in Fig. 2 to the vertical full line positions aligned with the ram pistons and the downward projection of the pistons, and the attached legs, will continue until the feet 20 of the legs contact the ground and elevate that portion of the vehicle under which the rams are interposed sufficiently above the ground or road to remove the load from the wheels and place the load on the supporting rams. The downward projection of the ram pistons is against the tension of the coiled springs 25 and serve to elongate the same. The major portion of the angular travel of the legs 19 is controlled by the length of the depending racks 22. The final position of the surface engaging feet is determined by gravity which permits a natural contact of said feet with the supporting surface.

When it is desired to return the supported vehicle to its normal position with the wheels in ground engaging condition the control valve 15 is manipulated to permit a relief of the hydraulic fluid pressure and the weight of the load assisted by the contracting action of the coiled springs 25 will cause the pistons 17 to telescope upwardly within the ram cylinders 16 and when the rack pinions 21 are brought into engagement with the racks 22, the pivotal action of the shafts 18 will return the legs 19 and feet 20 to their elevated horizontal inoperative positions. The elevation of the ram pistons 17 will permit the vehicle load to be again borne by the wheels 13 and as soon as the vehicle load is borne by the wheels the contracting force of the springs 25 then become the sole means for returning the pistons to their fully retracted positions.

The numerals 27 indicate a pair of primary levers mounted below the vehicle body 11, longitudinally thereof and above the axes of the ram cylinders 16. Adjacent their outer or rear ends these primary levers 27 are fulcrumed on the posts 23, as at 28 in Fig. 1. Also, they are pivotally secured to caps at the upper ends of the ram cylinders 16, as at 29 in Fig. 1. It is clear, therefore, that when the load elevating mechanism is in its operative position and the vehicle wheels are raised above the surface, the load is carried by the hydraulic rams and is transferred to the primary levers 27 which are fulcrumed on the vehicle mounted members 23. The primary levers 27 function to apply the load to the load indicating or weighing mechanism which will now be described.

The numeral 30 represents an indicator housing, and an indicator housing 30 with contained mechanism may be mounted preferably on each inner side wall of the vehicle body 11 or in any other protected position accessible for observation by the vehicle operator. The front of each casing 30 is open so that the mechanism therein may be readily observed. Pivotally mounted within a lower end portion of an indicator housing is a dial lever 31 which is adapted to be oscillated by a vertical rod or connection 32 connected at its upper end to the dial lever and extended downwardly through a suitable opening therefor in the indicator housing and also extended through a suitable opening in the lower portion of the vehicle body or frame to connect with the outer end portion of a pivotally mounted transverse lever 33, it being understood that there is one transverse lever 33 for each primary lever 27 extending laterally outwardly from the outer end of each primary lever 27. The inner end of each transverse lever 33 is pivotally mounted on a frame carried bracket 34 as at 35.

The manner in which the lower end of each vertical rod or connection 32 is associated with the outer end of its transverse lever 33 is best shown in Figs. 2 and 5. From Fig. 5 is will be observed that the outer end portion of a transverse lever 33 is bifurcated, and secured within the bifurcated end is a block 36 having a knife edge lower portion which engages the upper dished surface of a retaining block 37, the lower end portion of the rod or connection 32 being extended through a vertical bushing in the block 36 and through the retaining block 37, the latter being secured on the lower end of the rod 32 by a nut 38 threaded onto the lower end of the rod or connection 32. Thus, the inner ends of the transverse levers 33 being pivoted onto the vehicle frame as at 35 and being actuated by the adjacent ends of the primary levers 27 thereabove, the outer end portions of the transverse levers 33 are free to move in vertical arcs and through the connections described may impose pulls on the vertical rods or connections 32 leading to the dial levers 31 within the indicator housings 30.

As will be observed most clearly from Fig. 3, one end portion of each dial lever 31 is pivoted and the other end portion has anchored thereto a steel band or connection 39 which is anchored at its other end to the inner end portion of a scale pointer lever 40, the latter bearing suitable graduations throughout its length. The inner end portion of each scale pointer lever 40 is pivotally mounted in the indicator casing 30 by means of roller bearings 41. Adjustably positioned on the scale pointer lever 40 for movement along its length to register with a suitable graduation, is a main counterpoise or weight 42. The extended outer end portion of the scale pointer lever 40 extends behind an indicator chart 43 which is carried by an end wall of an indicator casing 30 and offset outwardly relative to the plane of the main portion of the pointer lever 40. Said extended portion of the pointer lever 40 inwardly of the indicator chart 43 may adjustably carry an auxiliary or secondary counterpoise weight 44. It will be observed that the outer face of the indicator chart 43 has affixed thereto or delineated thereon a pointed marker 45 which represents the predetermined or maximum load which the vehicle may carry and which is adapted to be in registration with a pointer 46 secured to the outer end portion of the pointer lever 40 and outwardly offset from its face. Anchored between the outer end portion of the pointer lever 40 and a lower wall portion of the indicator casing 30 is a normally contracted coiled spring 47 which, when the vehicle carries less than its prescribed maximum load, is effective to hold the outer end portion of the pointer lever 40 in a lower position, represented by broken lines in Fig. 3 in registration with or below a "minus" sign 48 on the chart 43, thereby giving a visual indication that the vehicle's load has not reached the prescribed maximum value represented by registration of the pointer end 46 with the chart marker 45. Spacedly above the normal marker 45 on the chart 43 is a "plus" sign 49 which, when the position of the pointer 40 approaches the raised broken line position in Fig. 3 indicates that the load of the vehicle is in excess of the prescribed maximum.

By way of example suppose, for instance, that the laws of the particular state in which the vehicle is operating permit a load of 18,000 pounds per single axle with an additional tolerance of 1500 pounds. When the truck is not loaded and the mechanism is set into operation, the scale pointer lever 40, of course, assumes the lowermost broken line position in Fig. 3. The spring 47 may have, for instance, a resistance of 2,000 pounds and in respect to the example stated the counterpoise or weight 42 on the pointer lever 40 will then be adjusted to register with the graduation on the pointer lever 40 corresponding to 16,000 pounds. When the vehicle operator desires to ascertain whether or not his load is approaching the established limits (18,000 pounds with a 1500 pound tolerance) he will then, through the control valve 15 of the hydraulic pump 14, operate the hydraulic rams to extend the feet 20 into ultimate ground or surface engaging condition, elevating the wheels 13 and transferring the load from the wheels to the hydraulic rams. The latter are, however, fulcrumed on the primary levers 27 and the opposite ends of the levers 27 then rock the transverse levers 33 to an extent to cause downward pull on the vertical connections 32. Motion will then be transmitted to the dial levers 31 which, through the connected bands 39 will exert a pivotal force on the pointer levers 40. If the vehicle load is sufficient to overcome the resistance of the springs 47 and the adjusted position of the counterpoise weights, the pointer levers will move toward their horizontal positions commensurate with the load. However, due to the adjusted position of the counterpoises 42 and the resistance of the springs 47 there will be no movement of the pointer levers 40 until the actual load exceeds the predetermined value which in the example given was 18,000 pounds. At such point the outer end portions of the pointers will then register with the intermediate markers 45 on the chart. A position therebelow indicates that the vehicle has not been loaded to the predetermined maximum. Any position of the outer ends of the pointer levers above the intermediate markers 45 tells the operator that the vehicle load is in excess of the predetermined setting (18,000 pounds), but it may still be within the tolerance allowed, which in the example given was 1500 pounds. After the vehicle operator has determined from the indicator whether or not his load has reached the prescribed maximum and the hydraulic rams are operated to lower the vehicle onto its wheels, the load is then removed from the lever system which actuates the indicator, and the scale pointer lever 40 will return to its low position as per the lowermost broken line shown in Fig. 3.

A slightly modified form of indicator mechanism is shown in Fig. 6 wherein the connection 32' from a transverse lever 33 extends into the indicator casing 30' and connects directly with the pivotally mounted end of the scale pointer lever 40'. This simplified arrangement eliminates the dial lever 31 shown in Fig. 3 and can be used to advantage where the loads are relatively light and the reducing function of the dial lever 31 is not required.

It should be understood that the load elevating and indicating devices may be associated with any suitable and convenient portions of the vehicle. The specific embodiment disclosed is merely by way of illustration. It is also obvious that any type of elevating mechanism may be used other than the hydraulic rams illustrated.

From the foregoing description it will be understood that the improved vehicle carried load elevating and indicating mechanism is simple, is easily operated, may be put into quick service at any point in the route of a cargo or freight carrying vehicle, is always available, and is well adapted for the purposes set forth.

What is claimed as the invention is:

1. In combination with a wheeled cargo vehicle having a frame, a load indicator operatively permanently mounted on the vehicle, indicator operating mechanism operatively permanently borne by the vehicle having a frame and extending to the load indicator, and elevating mechanism operatively engaging said indicator operating mechanism for interposition between the latter and any surface on which the vehicle is stationed to elevate the vehicle and some of its wheels and transfer the vehicle load to said indicator operating mechanism to actuate the same without advancing the vehicle horizontally.

2. In combination with a wheeled vehicle for freight having a frame, a load indicator operatively permanently mounted on said vehicle to indicate attainment or excess of a predetermined vehicle load, indicator operating mechanism operatively permanently borne by the vehicle frame and extending to the indicator, and a jack movably associated with the vehicle for transportation therewith and operatively connected with said indicator operating mechanism for interposition between the latter and any surface on which the vehicle is stationed to transfer the vehicle load from certain of the vehicle wheels to said indicator operating mechanism to actuate the same, whereby actuation of the indicator is automatically accomplished.

3. In combination with a wheeled cargo vehicle having a frame, a load indicator operatively mounted on said vehicle for transportation therewith, said indicator carrying adjustable means permitting actuation of said indicator when a prescribed maximum vehicle load value has been attained, indicator operating mechanism operatively permanently borne by the vehicle frame and extending to the load indicator, and elevating mechanism transportably associated with the vehicle and operatively engaging said indicator operating mechanism for interposition between the latter and any surface on which the vehicle is stationed to transfer the vehicle load from certain of the vehicle wheels to said indicator operating mechanism to actuate the same to move the load indicator commensurate with the maximum load value for which said indicator has been set.

4. In combination with a wheeled cargo vehicle having a frame, a load indicator operatively permanently mounted on the vehicle in an accessible position for observation, a lever system connected to the load indicator for operating the latter pursuant to a load imposed on said lever system, means fulcruming said lever system on said vehicle frame, and a jack pivotally depended from a portion of the lever system for selective interposition between the latter and a surface on which the vehicle is stationed to transfer the vehicle load from some of the vehicle wheels to said lever system while elevating said wheels.

5. In combination with a wheeled cargo vehicle having a frame, a load indicator operatively permanently mounted on said vehicle in an accessible position for observation, a lever system connected to the load indicator for operating the latter pursuant to a load imposed on said lever system, means fulcruming said lever system on said vehicle frame, a jack pivotally depended from a portion of the lever system for operative interposition between the latter and the vehicle roadway to transfer the vehicle load to said lever system for operation of the load indicator, means normally maintaining the jack in an inoperative position relative to the vehicle and lever system, and power means for operating the jack to and from ground engaging and load transferring position while the vehicle remains dormant.

6. In combination with a vehicle having a cargo receiving body, a frame and a pair of supporting wheels therebelow, a body load indicator operatively permanently carried by the vehicle body, a primary lever fulcrumed on a portion of the vehicle frame, a secondary lever also fulcrumed on a portion of the vehicle frame in a position to be engaged and rocked by said primary lever, a motion transmitting connection between said secondary lever and said body load indicator, and vehicle elevating mechanism for engagement with a surface on which the vehicle is stationed depended directly from said primary lever to transfer the vehicle load from the supporting wheels and translate the load to said load indicator through said levers and connection.

References Cited in the file of this patent

UNITED STATES PATENTS

| | | |
|---|---|---|
| 36,631 | Blackman | Oct. 7, 1862 |
| 82,204 | Bugbee | Sept. 15, 1868 |
| 151,241 | Paddock | May 26, 1874 |
| 439,217 | Wanamaker | Oct. 28, 1890 |
| 861,176 | Hinck et al. | July 23, 1907 |
| 1,581,769 | Wiley | Apr. 20, 1926 |
| 1,719,734 | Smith | July 2, 1929 |
| 2,020,307 | Fitch | Nov. 12, 1935 |
| 2,021,733 | Luker | Nov. 19, 1935 |
| 2,040,071 | Brendel | May 12, 1936 |
| 2,131,684 | Haegele et al. | Sept. 27, 1938 |
| 2,143,182 | Barr | Jan. 10, 1939 |
| 2,606,744 | Tracey | Aug. 12, 1952 |

FOREIGN PATENTS

| | | |
|---|---|---|
| 447,648 | Great Britain | May 22, 1926 |
| 28,220 | Australia | Aug. 4, 1931 |